United States Patent
Shimura (10) Patent No.: US 7,530,720 B2
(45) Date of Patent: May 12, 2009

(54) BACKLIGHT UNIT AND DISPLAY APPARATUS HAVING THE SAME

(75) Inventor: Takashi Shimura, Fujiyoshida (JP)

(73) Assignee: Citizen Electronics Co., Ltd., Yamanashi-ken (JP)

(*) Notice: Subject to any disclaimer, the term of this patent is extended or adjusted under 35 U.S.C. 154(b) by 134 days.

(21) Appl. No.: 11/710,311

(22) Filed: Feb. 23, 2007

(65) Prior Publication Data

US 2007/0201242 A1 Aug. 30, 2007

(30) Foreign Application Priority Data

Feb. 24, 2006 (JP) .............................. 2006-049166
Dec. 7, 2006 (JP) .............................. 2006-330307

(51) Int. Cl.
*F21V 7/04* (2006.01)

(52) U.S. Cl. ........................ 362/606; 362/620; 362/626

(58) Field of Classification Search .......... 362/600–634
See application file for complete search history.

(56) References Cited

U.S. PATENT DOCUMENTS 6,244,719 B1 * 6/2001 Oda et al. ................... 362/620
6,357,888 B1 * 3/2002 Takata et al. ................ 362/620
6,502,947 B2 * 1/2003 Matsumoto et al. ......... 362/626
6,867,826 B2 * 3/2005 Miyashita .................... 349/61
7,128,456 B2 * 10/2006 Yamashita et al. .......... 362/606
7,139,464 B2 * 11/2006 Matsumoto et al. ......... 385/146
7,401,962 B2 * 7/2008 Yamashita et al. .......... 362/606

FOREIGN PATENT DOCUMENTS

JP 2004-172003 A 6/2004

* cited by examiner

*Primary Examiner*—Sandra L O'Shea
*Assistant Examiner*—James W Cranson
(74) *Attorney, Agent, or Firm*—Brinks Hofer Gilson & Lione (57) ABSTRACT

A backlight unit includes a planar light source member that has a light-emitting surface and that emits light having directivity in a perpendicular direction to the light-emitting surface. An optical member has a light-receiving surface opposed to the light-emitting surface of the planar light source member and a light-emitting surface opposite to the light-receiving surface. The light-receiving surface has a multiplicity of prisms. By the prism action, the optical member emits the light having directivity in the perpendicular direction from the planar light source member as light having directivity in at least two directions on opposite sides of the perpendicular direction. The directions of light directivity are changed by varying the apex angle of the prisms.

17 Claims, 9 Drawing Sheets

BACKLIGHT UNIT AND DISPLAY APPARATUS HAVING THE SAME

This application claims priority under 35 U.S.C. §119 to Japanese Patent Application Nos. JP2006-049166 filed Feb. 24, 2006, and JP2006-330307 filed Dec. 7, 2006, the entire content of which is hereby incorporated by reference.

BACKGROUND OF THE INVENTION

1. Field of the Invention

The present invention relates to a backlight unit for use in display apparatus and also relates to a display apparatus having a backlight unit. More particularly, the present invention is concerned with the directivity of light.

2. Description of the Related Art

Figure 18:
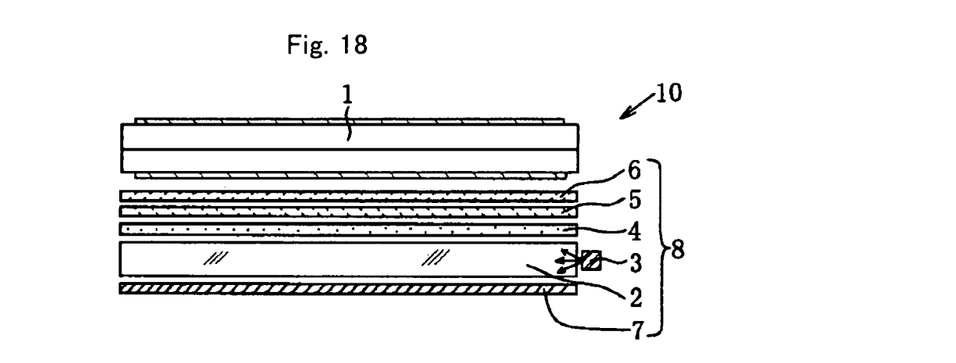
FIG. 18 is a sectional view of an essential part of a conventional liquid crystal display apparatus.

Liquid crystal display apparatus have been widely used in personal computers, liquid crystal display television systems, electronic organizers, cellular phones, and other terminal display devices. A backlight unit is provided behind a liquid crystal display panel of the liquid crystal display apparatus to make the displayed image appear bright and sharp. FIG. 18 in the accompanying drawings shows one type of conventional backlight unit structures.

A backlight unit 8 shown in FIG. 18 is provided directly below a liquid crystal display panel 1. The backlight unit 8 and the liquid crystal display panel 1 constitute a liquid crystal display apparatus 10. The backlight unit 8 comprises a lightguide plate 2, a light source 3 including LEDs disposed at one side surface of the lightguide plate 2, a light diffuser sheet 4 disposed directly above the lightguide plate 2, a pair of prism sheets 5 and 6 (first and second prism sheets) provided over the light diffuser sheet 4, and a reflector 7 provided directly below the lightguide plate 2. The first prism sheet 5 and the second prism sheet 6 have prisms each with a triangular sectional configuration and are stacked so that the ridges of their prisms project toward the liquid crystal display panel 1 and extend perpendicular to each other.

The backlight unit 8 having the above-described structure functions as follows. Light emitted from the light source 3, which includes LEDs, enters the lightguide plate 2 through the side surface thereof and exits from the upper surface of the lightguide plate 2 toward the light diffuser sheet 4 after the action of reflection by a prism surface (not shown) provided on the lower side of the lightguide plate 2. The light diffuser sheet 4 diffuses the incident light so that the quantity of light is uniformly distributed, and emits the diffused light toward the first and second prism sheets 5 and 6. The first and second prism sheets 5 and 6 direct the diffused light toward the liquid crystal display panel 1 at right angles thereto. Light emitting below the lightguide plate 2 through the prism surface on the lower side of the lightguide plate 2 is reflected by the reflector 7 to enter the lightguide plate 2 again. Thus, the backlight unit 8 is structured so that a maximum quantity of light from the light source 3 is effectively emitted and uniformly applied to the liquid crystal display panel 1, thereby brightly illuminating the displayed image on the liquid crystal display panel 1.

Figure 19:
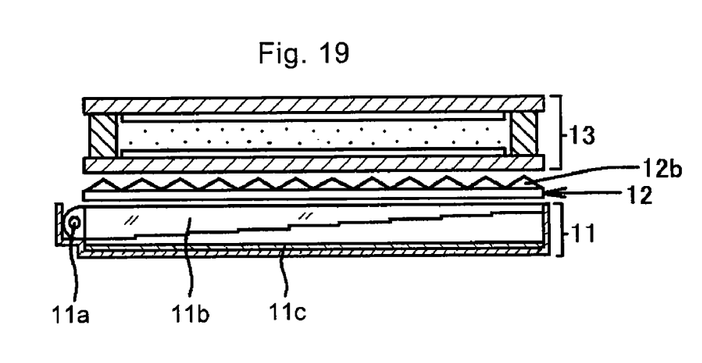
FIG. 19 is a sectional view schematically showing a liquid crystal display apparatus disclosed in Japanese Patent Application Publication No. 2004-172003.
Figure 20:
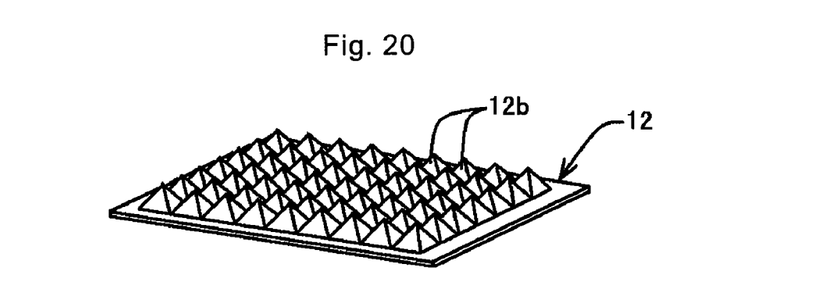
FIG. 20 is an enlarged perspective view of a light-directivity adjusting sheet in FIG. 19.

Japanese Patent Application Publication No. 2004-172003 discloses one of conventional techniques concerning backlight units. The structure shown in the Japanese Patent Application Publication has, as shown in FIG. 19, a light-directivity adjusting sheet 12 provided between a liquid crystal display unit 13 and a backlight unit 11, which includes a light source 11a, a lightguide 11b, a reflective sheet 11c, etc. The light-directivity adjusting sheet 12 is, as shown in FIG. 20, provided with quadrangular pyramids 12b. The backlight unit structure disclosed in the above-mentioned Japanese Patent Application Publication uses a single light-directivity adjusting sheet 12 provided with quadrangular pyramids 12b instead of using a stack of two prism sheets, thereby reducing the thickness of the backlight unit.

The above-described backlight structure for a liquid crystal display panel is arranged to emit light perpendicular to the display panel surface so that a bright display can be obtained on the display panel when viewed from a position directly in front of it.

Figure 21:
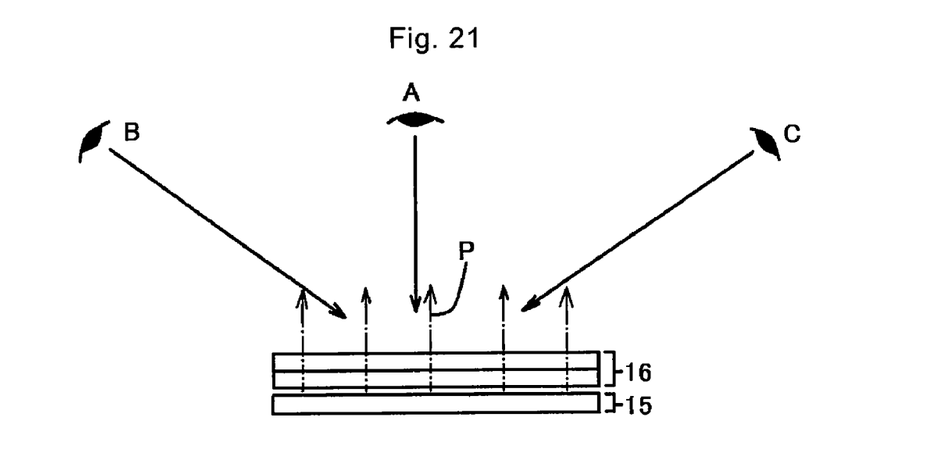
FIG. 21 is an explanatory view schematically showing how the way in which a display on a liquid crystal display panel is seen changes according to the position from which the display panel is viewed.

FIG. 21 is an explanatory view schematically showing how a liquid crystal display panel is viewed. In FIG. 21, light (illuminating light) P is emitted from a backlight unit 15 with directivity in a direction perpendicular to the display panel surface of a liquid crystal display panel 16. The light P illuminates the display panel surface of the liquid crystal display panel 16 and passes therethrough to exit directly above (as seen in the figure) the display panel surface. When the display panel surface of the liquid crystal display panel 16 is viewed from a position A directly in front of the liquid crystal display panel 16, a sharp image will be seen on the brightly illuminated display panel surface.

However, when the display panel surface is viewed from either of positions B and C on opposite sides of the liquid crystal display panel 16, the displayed image on the display panel surface appears somewhat dark and lacks sharpness. Let's take up an on-board car navigation system. Generally, an on-board car navigation system is mounted in the vicinity of an approximately central position in the front of the car interior and thus positioned somewhat remote from and obliquely in front of the driver's and passenger's seats. When the display screen of the car navigation system is viewed from the driver's seat or the passenger's seat, the displayed image lacks sharpness and appears somewhat dark.

SUMMARY OF THE INVENTION

The present invention has been made in view of the above-described problem. Accordingly, an object of the present invention is to provide a backlight unit structure and a display apparatus that allow a bright and sharp display image to be seen even when the display apparatus is viewed from a position obliquely in front thereof as in the case of a car navigation system where the display screen is viewed obliquely sideways, i.e. from the driver's seat or the passenger's seat.

The present invention provides a backlight unit including a planar light source member that has a light-emitting surface and that emits light having directivity in a perpendicular direction to the light-emitting surface. The backlight unit further includes an optical member having a light-receiving surface opposed to the light-emitting surface of the planar light source member and a light-emitting surface opposite to the light-receiving surface. The optical member emits the light having directivity in the perpendicular direction as light having directivity in at least two directions of opposite sides of the perpendicular direction.

In the backlight unit according to the present invention, light from the planar light source member is emitted from the optical member as light having directivity in at least two directions on opposite sides of the perpendicular direction, that is, the exiting direction of light from the planar light source member. Therefore, the above-described problem with the related art can be solved.

Specifically, the backlight unit may be arranged as follows. The light-receiving surface and the light-emitting surface of the optical member are placed parallel to the light-emitting surface of the planar light source member. The light-receiving surface has a multiplicity of prisms extending parallel to each other and perpendicular to the above-described perpendicular direction, so that light having directivity in the perpendicular direction that is incident on the light-receiving surface is converted by the prisms into light having directivity in at least the two directions.

More specifically, the prisms may have a triangular sectional configuration projecting toward the light-emitting surface of the planar light source member and extend in a direction perpendicular to light having directivity in the perpendicular direction.

Preferably, the apex angle of the prisms that faces the light-emitting surface of the planar light source member ranges from 60° to 115°.

If the apex angle is larger than 115°, exiting light has one directivity direction, i.e. directivity in the above-described perpendicular direction. If the apex angle is not larger than 115°, light having directivity in two directions can be emitted, but if the apex angle is smaller than 60°, it becomes difficult to perform molding for forming the prisms. Therefore, the apex angle is set in the above-described angle range. By so doing, light having directivity in two directions can be emitted from the light-emitting surface of the optical member.

Preferably, the sectional configuration of the prisms is an isosceles triangle.

When the sectional configuration of the prisms is not an isosceles triangle, the bilateral directional angles with respect to the perpendicular direction can be made different from each other. Usually, however, the prisms are formed with an isosceles triangular sectional configuration. Therefore, it is possible to emit light having directivity in bilateral directions with the same angle to the perpendicular axis.

Besides the above, the prisms may have a trapezoidal sectional configuration projecting toward the light-emitting surface of the planar light source member and extend in a direction perpendicular to the perpendicular direction. The prisms each have a plane surface at the center thereof and inclined surfaces on opposite sides of the plane surface.

With the trapezoidal prisms having a trapezoidal sectional configuration, it is possible to emit light having directivity in the above-described perpendicular direction in addition to directivity in bilateral directions with angles to the perpendicular direction. Accordingly, a display apparatus using the backlight unit arranged as stated above allows a bright image to be seen from a position directly in front of the display apparatus as well as from left and right oblique directions.

In this case, the angle formed by the inclined surfaces of each prism may ranges from 60° to 115°, and the inclined surfaces may intersect the plane surface at the same angle.

In addition, the present invention provides a display apparatus including the above-described backlight unit and a display panel having a light-receiving surface opposed parallel to the light-emitting surface of the optical member of the backlight unit and a light-emitting surface opposite and parallel to the light-receiving surface thereof.

Preferably, the display plate is a liquid crystal display panel.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 2b is an enlarged view of part 2b in FIG. 2a.

DESCRIPTION OF THE PREFERRED EMBODIMENTS

A first embodiment of the present invention will be described below with reference to FIGS. 1 to 8.

Figure 1:
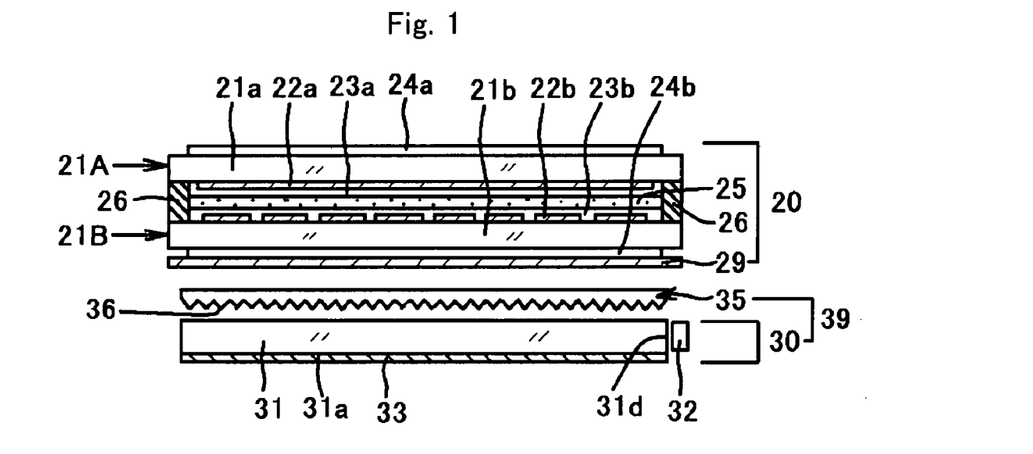
FIG. 1 is a sectional view of a display device having a backlight unit according to an embodiment of the present invention.

FIG. 1 shows a display device 20 having a backlight unit 39 according to an embodiment of the present invention. The backlight unit 39 includes a planar light source member 30 and an optical member 35 having prisms 36.

The display device 20 is a type of liquid crystal display. The liquid crystal display device has a liquid crystal material 25 sealed with a sealant 26 in a gap between an upper substrate 21A and a lower substrate 21B. A semitransmitting-reflecting sheet 29 having both light transmitting and reflecting functions is provided at the lower side of the lower substrate 21B. As the liquid crystal material 25, TN (Twisted Nematic) liquid crystal or STN (Super Twisted Nematic) liquid crystal, for example, may be used. The semitransmitting-reflecting sheet 29 may be, for example, a reflective polarizer or an aluminum-evaporated sheet formed with light-transmitting properties. The upper substrate 21A consists essentially of a transparent substrate 21a made of glass, for example. An upper transparent electrode 22a made of ITO (Indium Tin Oxide) film is provided on the lower surface of the upper transparent substrate 21a, and an upper alignment film 23a is provided over the upper transparent electrode 22a. The upper alignment film 23a is formed by applying an alignment treatment to a transparent polyimide resin film or the like. In addition, an upper polarizer 24a is provided on the upper surface of the upper transparent substrate 21a. The lower substrate 21B consists essentially of a transparent substrate 21b made of glass, for example. Lower transparent electrodes 22b made of ITO film is provided on the upper surface of the lower transparent substrate 21b, and an alignment film 23b is provided over the lower transparent electrodes 22b. The alignment film 23b is formed by applying an alignment treatment to a transparent polyimide resin film, for example. In addition, a lower polarizer 24b is provided on the lower surface of the lower transparent substrate 21b.

The optical member 35 is a transparent sheet-shaped member having prisms 36. The prisms 36 have a triangular sectional configuration and are arranged so that the ridges of the prisms 36 are parallel to each other. The optical member 35 is placed so that the surface thereof where the prisms 36 are provided faces the planar light source member 30.

The planar light source member 30 in this embodiment comprises a lightguide plate 31, a light source 32 including LEDs, and a reflector 33 provided over the lower surface 31a of the lightguide plate 31. The lightguide plate 31 is made from a transparent polycarbonate or acrylic resin, for example. The lower surface 31a of the lightguide plate 31 has reflecting means, e.g. prisms, to reflect incident light from the light source 32 toward the optical member 35. As the light source 32, LEDs or cold-cathode fluorescence lamps are used, for example. In this embodiment, LEDs are used to constitute the light source 32. A necessary number of LEDs are provided in close proximity to an end surface 31d of the lightguide plate 31. The number of LEDs used is determined in accordance with the size of the lightguide plate 31. The reflector 33 is made of a metal sheet, film or foil having a light-reflecting function. In this embodiment, a film provided with an evaporated aluminum layer is used as the reflector 33. Light emitted from the light source 32 is led to the inner part of the lightguide plate 31 and emitted from the upper surface of the lightguide plate by the action of the reflecting means or prisms provided on the lower surface 31a of the lightguide plate 31. The reflector 33, which is provided below the lower surface 31a of the lightguide plate 31, reflects light exiting through the lower surface 31a back into the lightguide plate 31. The planar light source member 30 functions as a planar illuminating light source that illuminates the display device 20.

Figure 2A:
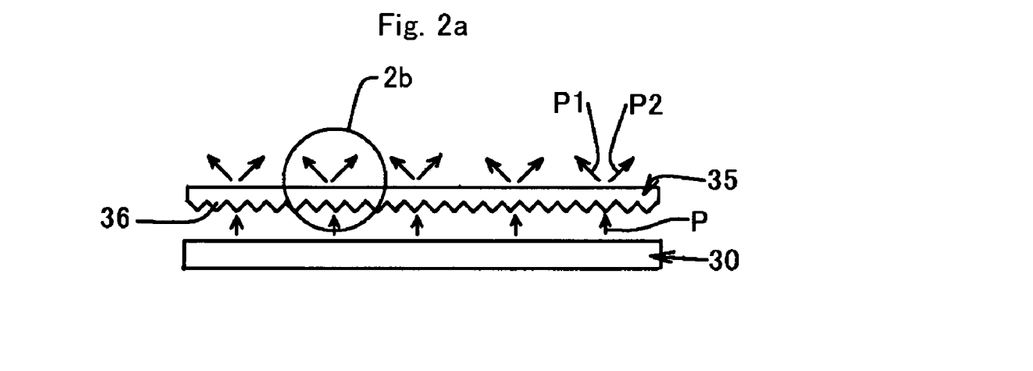
FIG. 2a is a sectional view schematically showing an optical member in FIG. 1.
Figure 2B:
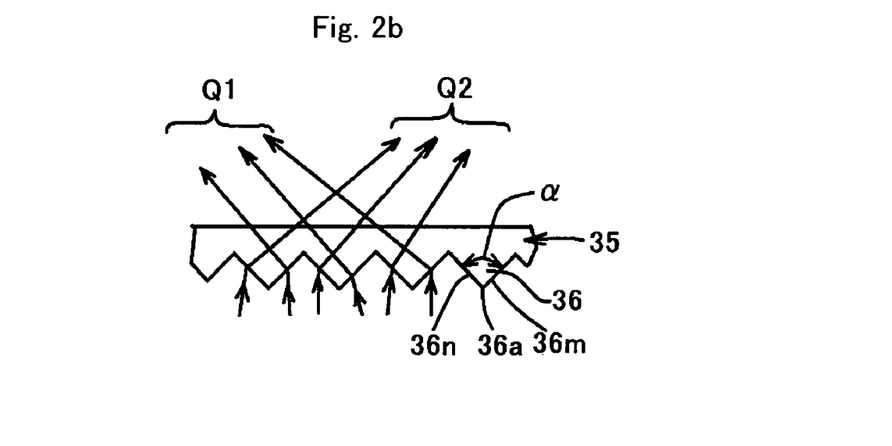

FIGS. 2a and 2b are schematic views for explaining the action of the optical member 35. In FIG. 2a, light P exiting the planar light source member 30 enters the prisms 36 of the optical member 35. The light P passes through the optical member 35 and exits in two different directions $P_1$ and $P_2$. That is, the optical member 35 converts the light P into two light $P_1$ and $P_2$ that are directed in two different directions. In FIG. 2b, each prism 36 has two inclined surfaces 36m and 36n intersecting each other to define an apex angle α of the prism. Light incident on the inclined surface 36m is refracted to exit in the direction $Q_1$ as shown in the figure. Light incident on the inclined surface 36n is refracted to exit in the direction $Q_2$.

Thus, rays of light incident on the inclined surfaces 36m and 36n, which define the prism apex angle α, are directed in the directions $Q_1$ and $Q_2$, respectively.

Figure 3:
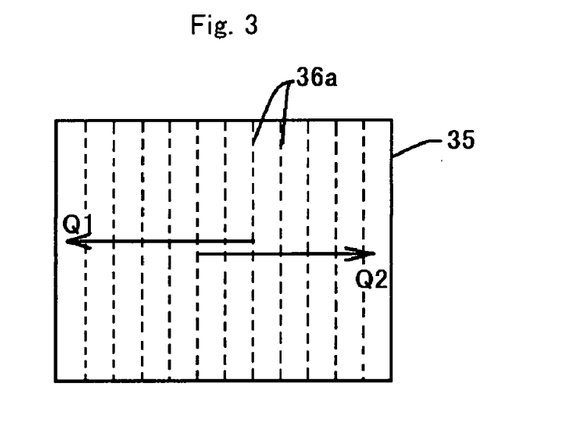
FIG. 3 is a plan view showing the relationship between directions in which light is directed and the orientation of the optical member.

FIG. 3 is a plan view showing the relationship between the directivity of the exiting light rays and the orientation of the optical member 35. In FIG. 3, the arrows $Q_1$ and $Q_2$ indicate the directivity shown in FIG. 2b. The light directivity directions $Q_1$ and $Q_2$ intersect perpendicularly to the ridges 36a of the prisms 36, which extend parallel to each other (in FIG. 3, the ridges 36a of the prisms are shown by the chain lines).

Figure 4:
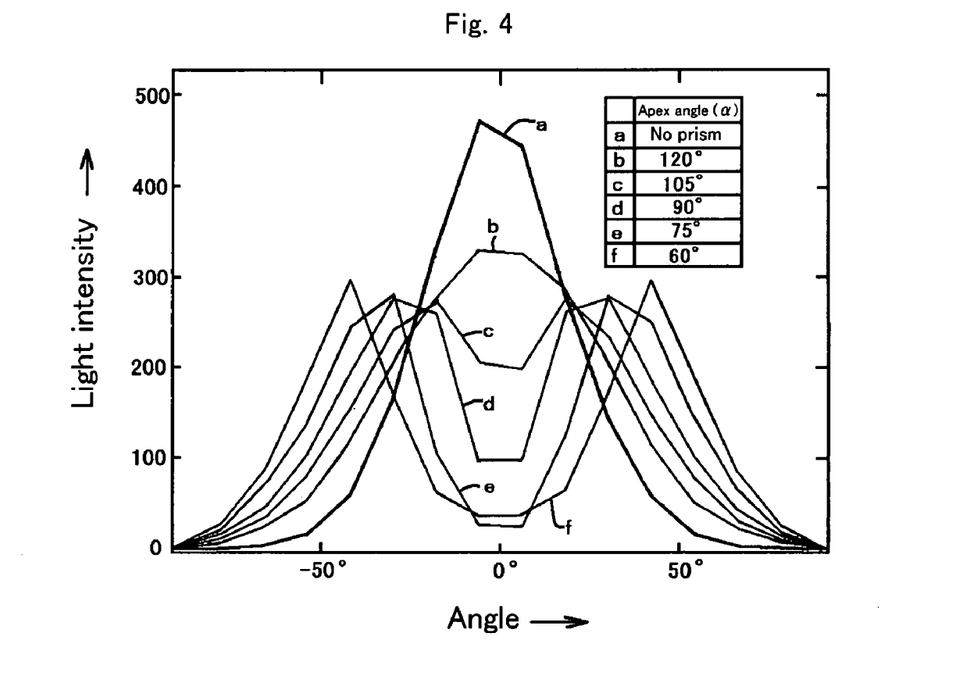
FIG. 4 is a graph showing the results of simulating directional characteristics for various prism apex angles.

The light directivity directions change with the value of the prism apex angle α. FIG. 4 is a graph showing the relationship between the prism apex angle of the prisms and directional characteristics, in which the abscissa axis represents the directional angle, and the ordinate axis represents the intensity of light. That is, the graph shows the relationship between the directional angle and the light intensity by simulation (computation) with regard to optical members having various prism apex angles. Curve a shows the directivity of an optical member having no prisms. Curve b shows the directivity of an optical member having a prism apex angle of 120°. Curve c shows the directivity of an optical member having a prism apex angle of 105°. Curve d shows the directivity of an optical member having a prism apex angle of 90°. Curve e shows the directivity of an optical member having a prism apex angle of 75°. Curve f shows the directivity of an optical member having a prism apex angle of 60°. It will be understood from FIG. 4 that the optical member having no prisms (curve a) shows directional characteristics in which the light intensity reaches a peak at an angle of 0° and gradually decreases as the angle deviates from 0° in either the plus or minus direction, thus forming a normal distribution. This means that the brightness is highest at an angle of 0° and gradually lowers as the angle deviates from 0° in either the plus or minus direction. In contrast, the optical member whose prism apex angle is 60° (curve f) has two peaks of light intensity at two directional angles, i.e. about +42° and about −42°. This means that light is directed in two directions that are at angles of about ±42°. The optical members whose prism apex angles are 75° and 90° (curves e and d), respectively, have two peaks of light intensity at two directional angles, i.e. about ±30°. The optical member whose prism apex angle is 105° (curve c) has two peaks of light intensity at two directional angles, i.e. about ±18°. It will be understood from this graph that the more acute the prism apex angle, the larger the angle of direction at which the peak light intensity occurs.

Figure 5:
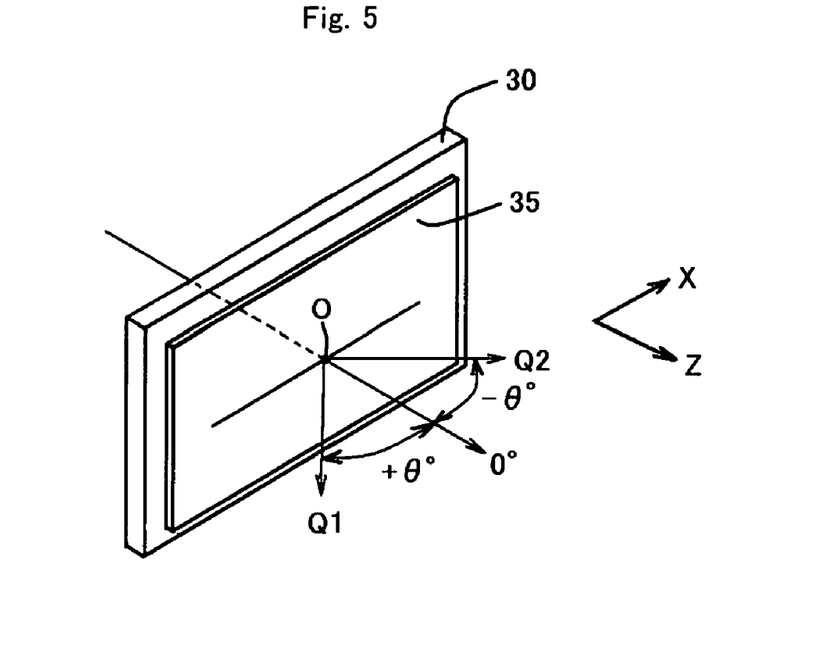
FIG. 5 is a perspective view explaining the angle in FIG. 4.

The angle plotted along the abscissa axis shown in FIG. 4 will be explained with reference to FIG. 5. In FIG. 5, the optical member 35 is provided in front of the planar light source member 30. Reference symbol O denotes the position from which light exits the optical member 35, which is defined as the origin of a coordinate system. An x-z plane that is defined by an x-axis and a z-axis is a plane in which incident light travels after being refracted by the optical member 35. $Q_1$ and $Q_2$ show directions in which exiting light rays travel at angles of +θ° and −θ°, respectively, with respect to the incident light.

Figure 6:
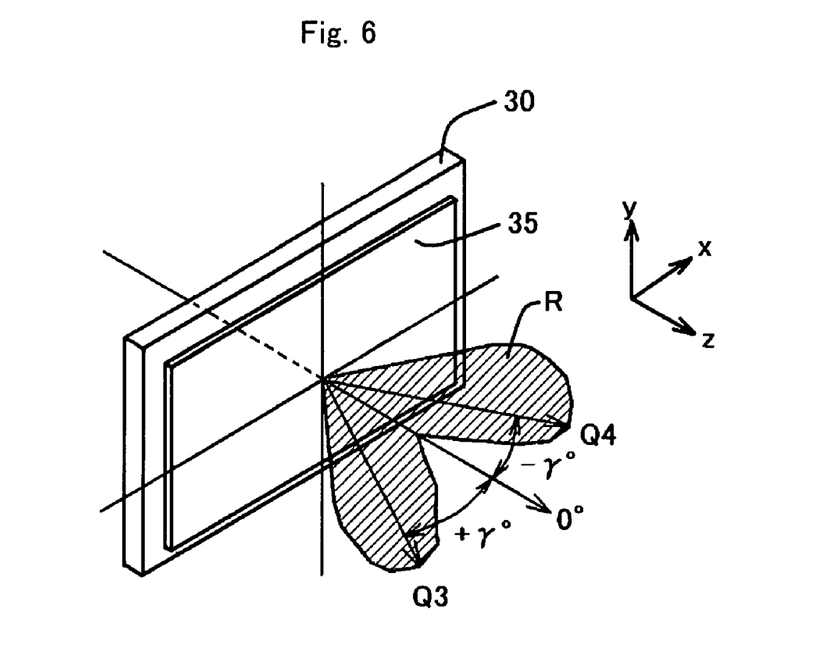
FIG. 6 is a perspective view schematically representing the directional characteristics shown in FIG. 4.

FIG. 6 is a three-dimensional representation of the directional characteristics of light with respect to the apex angle (α) shown in FIG. 4. In FIG. 6, the z-axis represents the light intensity. The hatched part R shows the directional characteristics, i.e. the relationship between the angle (directivity direction) and the light intensity. The light intensity peaks (becomes strong) in directions $Q_3$ and $Q_4$ at angles +γ° and −γ°. That is, a heart-shaped directivity pattern is obtained.

When the inclination angles of the two mutually opposing inclined surfaces 36m and 36n of the prisms 36 having a triangular sectional configuration are isometric, a symmetric heart-shaped directivity pattern is obtained as shown in FIG. 6. When the inclination angles of the two inclined surfaces 36m and 36n differ from each other, the bilateral directional angles of directivity of light become different from each other. In such a case, an asymmetric heart-shaped directivity pattern appears.

Figure 7:
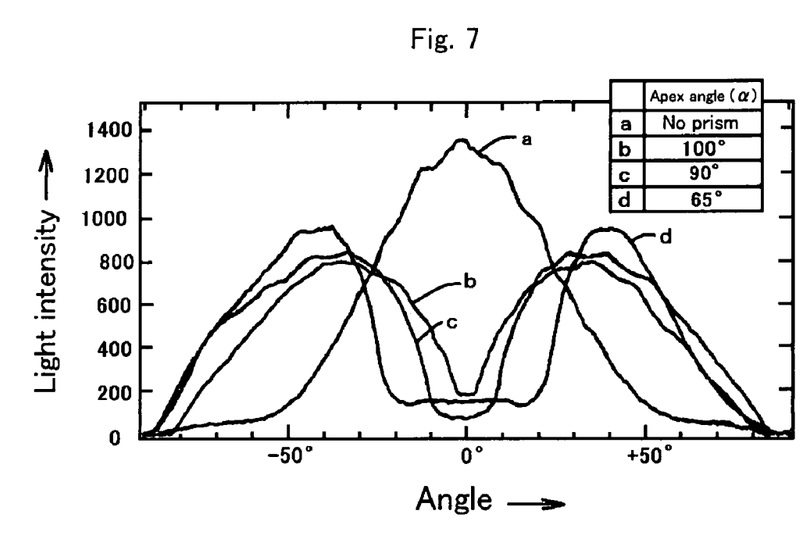
FIG. 7 is a graph showing the results of measuring directional characteristics for various prism apex angles.

FIG. 7 is a graph showing the measured values of directional characteristics of the following optical members: an optical member having no prisms (curve a); an optical member having a prism apex angle of 100° (curve b); an optical member having a prism apex angle of 90° (curve c); and an optical member having a prism apex angle of 65° (curve d). The directional characteristic curves shown in FIG. 7 are very close to the simulated curves shown in FIG. 4. For example, the optical member whose prism apex angle is 65° (curve d) has peak intensities at about ±40°. In this regard, the optical member whose prism apex angle is 60° (curve f) in the simulation shown in FIG. 4 has peak intensities at about ±42°. Thus, the two curves are very close to each other although there is a 5° difference in the apex angle. It will also be understood from the graph of FIG. 7 that the more acute the prism apex angle, the larger the angle of direction at which the peak light intensity occurs.

It will be clear from the above that the prism apex angle α is an important factor in determination of the direction of light directivity. In the present invention, the prism apex angle α is set to range from 60° to 115°. At an angle of 115°, light has directivity in two directions. If the prism apex angle α is larger than 115°, however, light has one directivity direction, i.e. directivity perpendicular to the exit surface (display surface). Consequently, a bright and sharp display image is seen when the display device is viewed from a position directly in front thereof, but the displayed image appears to lack brightness and sharpness when the display device is viewed from a position obliquely in front thereof. If the prism apex angle α is smaller than 60°, it becomes difficult to make a molding tool for forming such prisms 36.

The optical member 35 having the prisms 36 is formed by using a transparent polycarbonate, acrylic or polyethylene terephthalate resin. These resins are excellent in heat resistance, moisture resistance, impact resistance, light resistance, and chemical resistance. The optical member 35 has a thickness of 60 to 130 μm. The pitch of the prisms 36 is set at about 50 μm when the prism apex angle is 90°. The optical member 35 can be formed by a sheet forming method or a hot-pressing method. The surface of the optical member 35 where the prisms 36 are provided is finished into a glossy surface.

Figure 8:
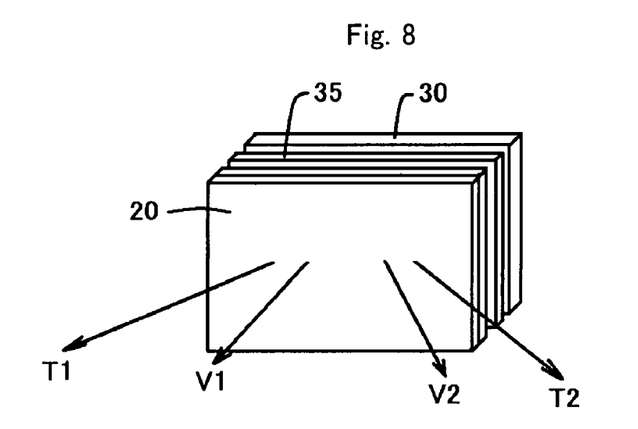
FIG. 8 is a perspective view explaining directivity of illuminating light exiting a display device.

The optical member 35 having the above-described structure is disposed between the display device 20 and the planar light source member 30. Light exiting the planar light source member 30 directly enters the optical member 35. The optical member 35 changes the optical path of the light, so that the light exits the optical member 35 with directivity in two directions. Then, the light enters the display device 20 and passes therethrough while keeping the directivity in the two directions. That is, illuminating light exiting the display device 20 has directivity as shown in FIG. 8. In FIG. 8, exiting light rays $T_1$ and $T_2$ from the display device 20 diverge from each other with a large divergent angle therebetween. The large divergent angle is obtained when using an optical member having a small prism apex angle. Exiting light rays $V_1$ and $V_2$ from the display device 20 diverge from each other with a small divergent angle therebetween. The small divergent angle is obtained when using an optical member having a large prism apex angle. If the optical member 35 is provided between the display device 20 and the planar light source member 30, light exiting the planar light source member 30 directly enters the optical member 35, and the light exits the optical member 35 with directivity in two directions. The light passes through and exits the display device 20 while keeping the light directivity. Because no member that affects light directivity is present between the optical member 35 and the display device 20, the directivity given to the light by the optical member 35 is kept as it is when the light comes out of the display device 20.

If a display apparatus having a backlight unit arranged as stated above is used in an on-board car navigation system or an on-board car television system, for example, light exiting the display apparatus directly reaches the eyes of occupants in the driver's seat and the passenger's seat. Accordingly, a bright and sharp display image can be seen in both the driver's and passenger's seats. The directions of directivity toward the two positions, i.e. the driver's and passenger's seats, are preferably set by appropriately selecting the prism apex angle.

Although in the above-described embodiment the planar light source member 30 and the optical member 35 are used to constitute the backlight unit 39, a diffuser sheet and a prism sheet, which are used in the above stated related art, may be additionally used to constitute the backlight unit 39.

Although the planar light source member 30 in the foregoing embodiment includes the lightguide plate 31, the light source 32, etc., it is also possible to use an electroluminescence (EL) device to constitute the planar light source member 30.

In the foregoing embodiment, the prisms 36 of the optical member 35 are those each having a triangular sectional configuration. However, the optical member 35 may be provided with trapezoidal prisms having a trapezoidal sectional configuration. If trapezoidal prisms are used, light directivity in three directions can be obtained.

Figure 9:
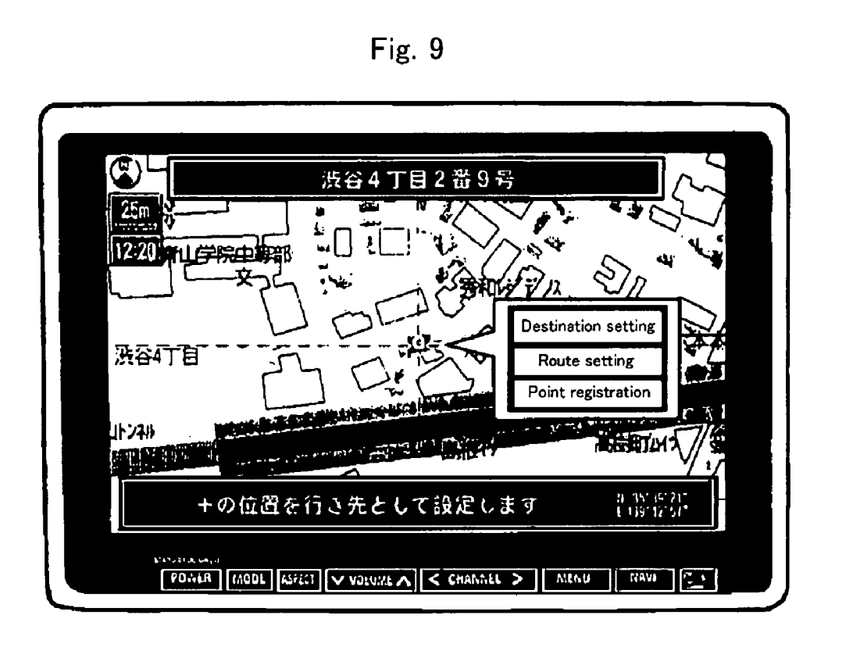
FIG. 9 is a plan view of a display apparatus having a backlight unit according to an embodiment of the present invention.
Figure 10:
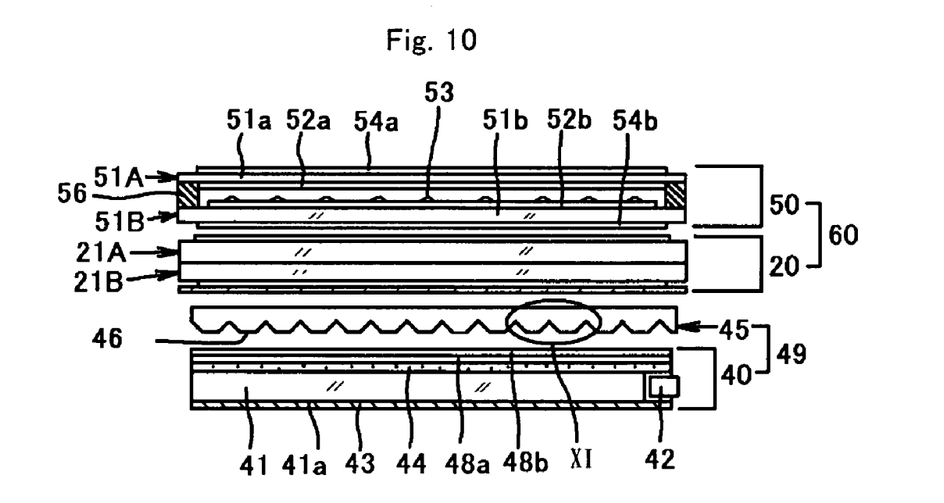
FIG. 10 is a sectional view of an essential part of the display apparatus shown in FIG. 9.

FIGS. 9 to 13 show an embodiment in which the present invention is applied to a display apparatus 60 of an on-board car navigation system. The display apparatus 60 has, as shown in FIG. 10, a touch panel 50 provided at the upper side of a display device 20. Entry of information such as a destination is performed by using the touch panel 50. The display apparatus 60 has a backlight unit 49 provided at the lower side thereof. The backlight unit 49 comprises a planar light source member 40 and an optical member 45.

The display device 20 of the touch panel-equipped display apparatus 60 is a liquid crystal display device having the same structure as that of the display device used in the foregoing embodiment. That is, the display device 20 has a liquid crystal material sealed with a sealant in a gap between an upper substrate 21A and a lower substrate 21B (illustration of the gap, liquid crystal and sealant is omitted in the figure). A semitransmitting-reflecting sheet having both light transmitting and light reflecting functions is provided at the lower side of the lower substrate 21B. The upper substrate 21A comprises a transparent substrate made of glass, for example. An upper transparent electrode made of ITO (Indium Tin Oxide) film is provided on the lower surface of the upper transparent substrate, and an upper alignment film is provided over the upper transparent electrode. The upper alignment film is formed by applying an alignment treatment to a transparent polyimide resin film or the like. In addition, an upper polarizer is provided on the upper surface of the upper transparent substrate. The lower substrate 21B comprises a lower transparent substrate made of glass, for example. Lower transparent electrodes made of ITO film are provided on the upper surface of the lower transparent substrate, and a lower alignment film is provided over the lower transparent electrodes. The lower alignment film is formed by applying an alignment treatment to a transparent polyimide resin film, for example. In addition, a lower polarizer is provided on the lower surface of the lower transparent substrate.

The touch panel 50 has a flexible upper substrate 51A and a lower substrate 51B that are bonded together with a sealant 56 with a predetermined gap provided therebetween. The upper substrate 51A comprises an upper transparent substrate 51a made of transparent and flexible glass having a thickness of 0.2 mm. An upper transparent electrode 52a made of ITO film is provided on the lower surface of the upper transparent substrate 51a, and an upper polarizer 54a is provided on the upper surface of the upper transparent substrate 51a. The lower substrate 51B comprises a lower transparent substrate 51b made of transparent glass, for example. Lower transparent electrodes 52b made of ITO film are provided on the upper surface of the lower transparent substrate 51b, and dot spacers 53 are provided in a dot matrix on the lower transparent electrodes 52b. In addition, a phase contrast plate 54b is provided on the lower surface of the lower transparent substrate 51b.

The touch panel-equipped display apparatus 60 is arranged as follows. The user views designation images displayed on the display device 20 through the touch panel 50 and presses the upper substrate 51A of the touch panel 50 at the position of a desired icon. Thereupon, the upper substrate 51A is deflected, and the upper transparent electrode 52a of the upper substrate 51A and the lower transparent electrode 52b of the lower substrate 51B contact each other to allow an electric current to flow therebetween, whereby an operation corresponding to the icon is performed. In FIG. 9, for example, if an icon for setting a destination is pressed, a display screen for "destination setting" appears, thereby allowing the user to enter information concerning a destination. A less thermally deformable material is selected for touch panels used in on-board car navigation systems. Therefore, the upper substrate 51A uses microglass having a thickness of 0.2 mm. Because the upper substrate 51A is formed from a glass material, the amount of deflection thereof is small. Therefore, the gap between the upper substrate 51A and the lower substrate 51B is set at about 10 μm. The size of gap is defined by the sealant 56 containing silica particles having a size equal to the amount of gap.

Figure 11:
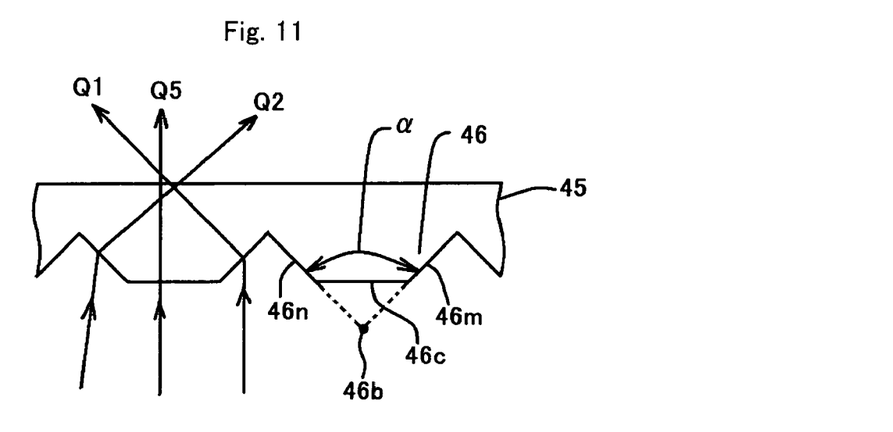
FIG. 11 is an enlarged view of part XI in FIG. 10.

As shown in FIG. 10, an optical member 45 having trapezoidal prisms 46 with a trapezoidal sectional configuration is disposed between the touch panel-equipped display apparatus 60 having the above-described structure and the planar light source member 40. At this time, the optical member 45 is positioned so that the surface thereof where the trapezoidal prisms 46 are provided faces the planar light source member 40. As shown in FIG. 11, the trapezoidal prisms 46 each have a trapezoidal sectional configuration formed from two mutually opposing inclined surfaces 46m and 46n and a flat surface 46c positioned therebetween. In the present invention, prisms having a trapezoidal sectional configuration are referred to as trapezoidal prisms.

Figure 12:
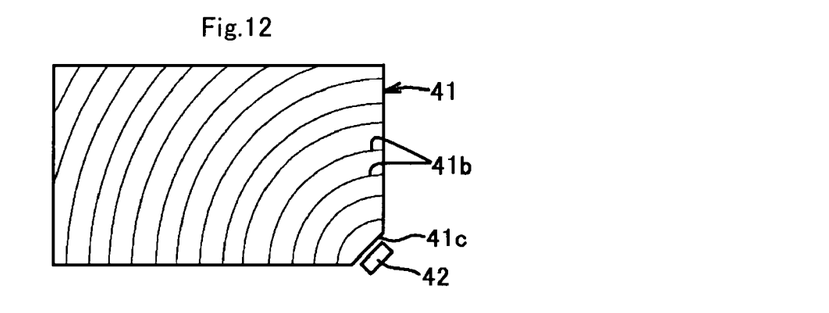
FIG. 12 is a schematic layout showing the positional relationship between a lightguide plate and a light source in FIG. 10.

The planar light source member 40 in this embodiment includes a lightguide plate 41, a light source 42 provided at a corner of the lightguide plate 41, a reflector 43 provided on the lower surface of the lightguide plate 41, a diffuser sheet 44 provided on the upper surface of the lightguide plate 41, and two prism sheets 48a and 48b provided over the diffuser sheet 44. The prism sheets 48a and 48b arranged parallel to each other and each of the prism sheets has a multiplicity of prisms. The prism sheets 48a and 48b are stacked so that the ridges of their prisms extend perpendicular to each other. The prism surfaces of both the prism sheets 48a and 48b face upward, i.e. toward the optical member 45. The lower surface 41a of the lightguide plate 41 is provided with a reflecting member consisting of circular prisms 41b. Light from the light source 42 is led to the inner part of the lightguide plate 41 and reflected toward the upper surface of the lightguide plate 41 by the action of the circular prisms 41b. The reflector 43 is formed from a film provided with an evaporated aluminum layer. The light source 42 is formed from LEDs and disposed at a cut corner 41c of the lightguide plate 41.

The LED of the light source 42 has light directivity and is therefore disposed at a corner so that the light from the LED covers the lightguide plate. With this layout structure, it is possible to minimize the number of LEDs used and hence possible to achieve a cost reduction advantageously. The lower surface 41a of the lightguide plate 41 is provided with circular prisms 41b that are concentric about the LED constituting the light source 42. With this arrangement, the circular prisms 41b reflect light in the same direction as that of light incident on the circular prisms 41b. Therefore, a uniform reflected light-quantity distribution can be obtained. Consequently, the unevenness in illumination brightness is minimized. The lightguide plate 41 is formed by using a transparent resin excellent in heat resistance, moisture resistance, impact resistance, light resistance, and chemical resistance, e.g. a transparent polycarbonate or acrylic resin.

The planar light source member 40 having the above-described structure leads light from the light source 42 to the inner part of the lightguide plate 41 by the action of the circular prisms 41b of the lightguide plate 41 and allows the light to exit from the upper surface of the lightguide plate 41 by the action of reflection by the circular prisms 41b and the reflector 43. The exiting light is diffused by the diffuser sheet 44 before exiting it. Because the light is diffused by the diffuser sheet 44, the emitted light quantity distribution is uniformed. Further, the diffused emitted light is passed through the prism sheets 48a and 48b so as to enter the optical member 45 at right angles thereto.

Light entering the trapezoidal prisms 46 of the optical member 45 exits as shown in FIG. 11. Light incident on the inclined surface 46m of each trapezoidal prism 46 is refracted to exit in the direction $Q_1$. Light incident on the inclined surface 46n is refracted to exit in the direction $Q_2$. Light incident on the flat surface 46c at the distal end passes through the optical member 45 as it is and exits from the upper side thereof in the direction $Q_5$. Accordingly, light can be directed in three directions by using the trapezoidal prisms 46.

Figure 13:
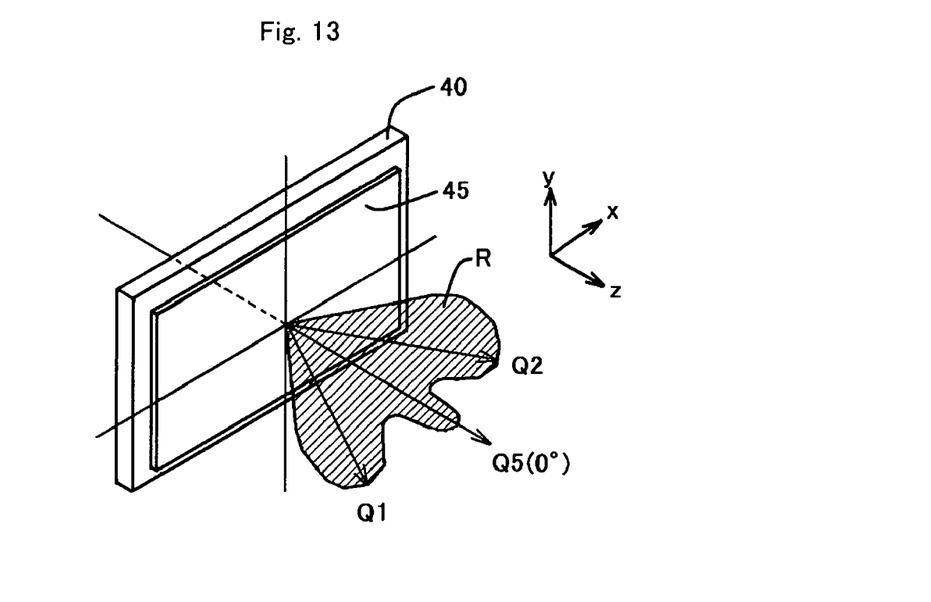
FIG. 13 is a perspective view schematically showing directional characteristics obtained from trapezoidal prisms of an optical member shown in FIG. 10.

FIG. 13 schematically shows the directivity in three directions. That is, the optical member 45 directs the incident light in three directions $Q_1$, $Q_2$ and $Q_5$. The direction $Q_5$ is perpendicular to the exit surface of the optical member 45. The directions $Q_1$ and $Q_2$ are left and right to the direction $Q_5$, respectively. Let us assume that the intersection between the extensions of the two inclined surfaces 46m and 46n of the trapezoidal prism 46 is denoted by reference symbol 46b, and the intersection angle of the intersection 46b is referred to as the "apex angle α" of the trapezoidal prism 46. The directional characteristics of light can be changed by varying the apex angle α, as has been stated above. The apex angle α is set in the range of from 60° to 115°. At an angle of 115°, light has directivity in two directions. If the prism apex angle α is larger than 115°, however, light has one directivity direction, i.e. directivity perpendicular to the exit surface (display surface). If the prism apex angle α is smaller than 60°, it becomes difficult to make a molding tool for forming the trapezoidal prisms 46. Light passing through the flat surface 46c at the distal end of the trapezoidal prism 46 exits at right angles to the exit surface of the optical member 45. The larger the width of the flat surface 46c, the larger the quantity of exiting light. Conversely, the smaller the width of the flat surface 46c, the smaller the exiting light quantity. Thus, the directions of directivity of light toward the left and right are set by the apex angle α, and the light quantity in the direction perpendicular to the exit surface is set by the width of the flat surface 46c.

If the backlight unit 49 having the above-described structure is attached to the back of the touch panel-equipped display apparatus 60 to form a display apparatus of a car navigation system, light having directivity in three directions is obtained from the display screen of the car navigation system. Of the three directions of directivity, a first direction is toward the passenger's seat. A second direction is toward the driver's seat. A third direction is toward a position directly in front of the car navigation system. If the displayed image on the car navigation system is viewed from any of the three directions, light exiting the car navigation system directly enters the viewer's eyes. Therefore, a bright and sharp display image is seen. Because a bright and sharp display image can also be seen from a position directly in front of the car navigation system, the entry of information into the car navigation system can be performed from the front thereof by actuating the touch panel 50 when the car is at rest. An information entry operation at night, in particular, can be performed under bright image illumination conditions. Further, because the trapezoidal prisms 46 have flat distal end surfaces, it is less likely that the trapezoidal prisms 46 will damage the planar light source member 40, which is placed thereunder, even if the trapezoidal prisms 46 contact it.

In the foregoing embodiment, the backlight unit is applied to a car navigation system, by way of example. It should be noted, however, that the backlight unit structure according to the embodiment is also applicable to on-board liquid crystal display television systems and the like. With an on-board liquid crystal display TV system incorporating the backlight unit structure of the embodiment, a bright and sharp TV image can be seen from the passenger's seat and the driver's seat and also from the back seats.

Figure 14:
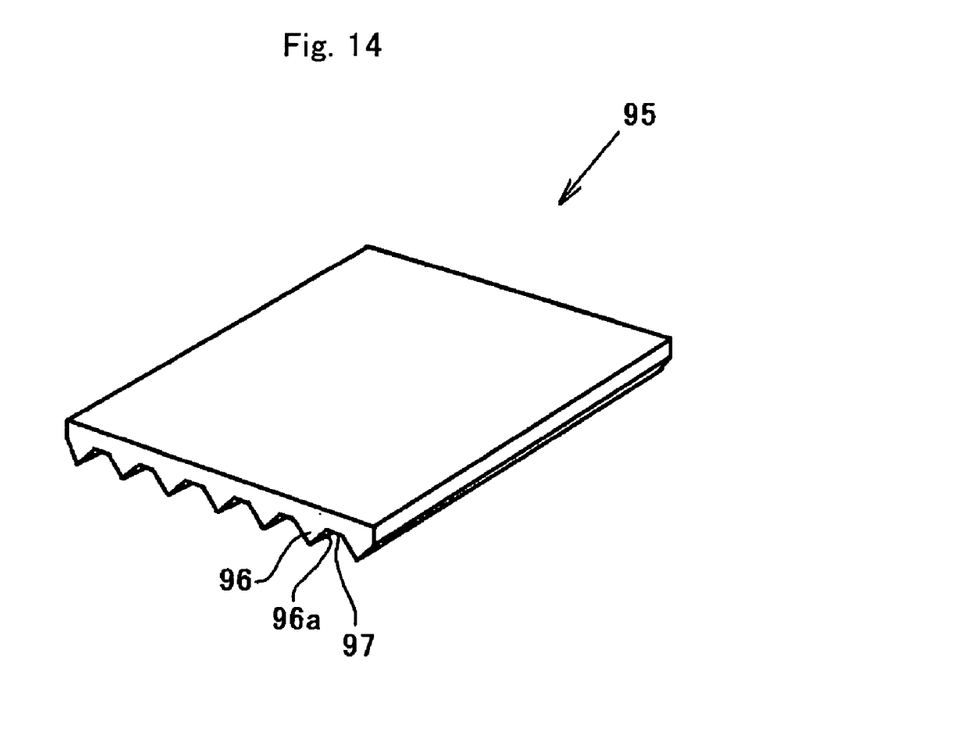
FIG. 14 is a perspective view of an optical member in a modification of the embodiment of the present invention.

The backlight unit 49 according to the foregoing embodiment uses the optical member 45 having the trapezoidal prisms 46. FIG. 14 shows a modification of the embodiment that can offer advantageous effects similar to those obtained from the foregoing embodiment. An optical member 95 in this modification has triangular prisms 96 on a surface thereof that faces the planar light source member. The triangular prisms 96 have a triangular sectional configuration and are arranged such that their ridges 96a are parallel to each other, with a flat region 97 interposed between each pair of adjacent triangular prisms 96.

Figure 15:
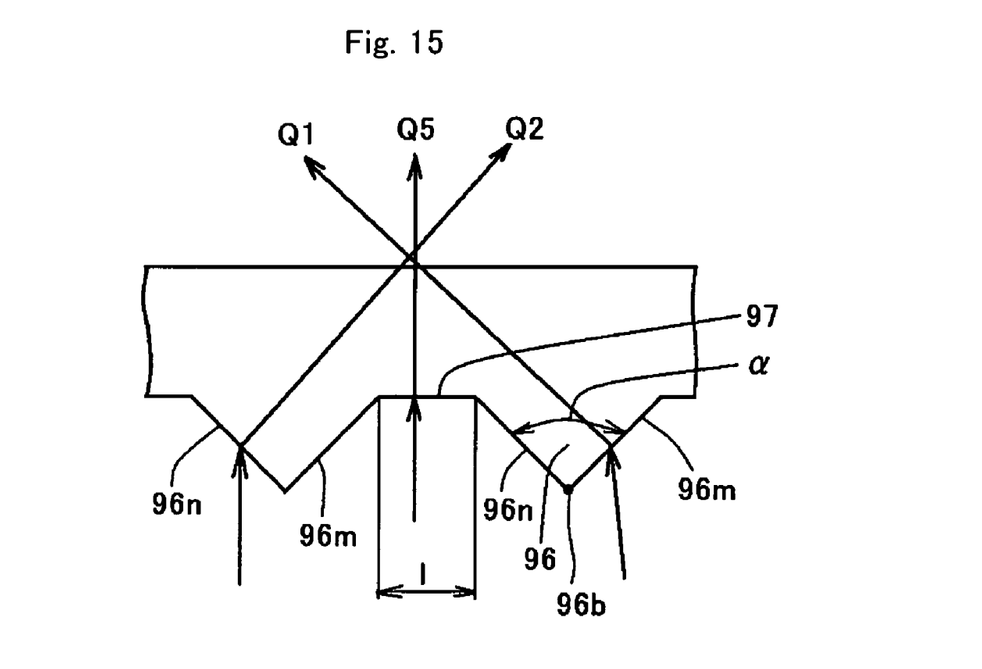
FIG. 15 is a fragmentary sectional view schematically showing an essential part of the optical member shown in FIG. 14.

FIG. 15 is a fragmentary sectional view schematically showing an essential part of the optical member 95 shown in FIG. 14. Light from the planar light source member is incident on the optical member 95 substantially at right angles thereto by the action of the two superimposed prism sheets of the planar light source member. The triangular prisms 96 each have, as shown in FIG. 15, two inclined surfaces 96m and 96n. Light incident on the inclined surface 96m is refracted to exit in the direction $Q_1$. Light incident on the inclined surface 96n is refracted to exit in the direction $Q_2$. Light incident on the flat region 97 is not substantially refracted and exits in the direction $Q_5$. Thus, light rays directed in the three directions $Q_1$, $Q_2$ and $Q_5$ exit the optical member 95. This is the same effect as obtained from the above-described optical member 45 having the trapezoidal prisms 46.

The optical member 95 allows the directions $Q_1$ and $Q_2$ to be changed by varying the angle α of the apex 96b of each triangular prism 96. The quantity of light directed in the direction $Q_5$ can be changed by varying the width 1 of the flat region 97. These operational advantages are the same as those in the case of the trapezoidal prisms 46. The apex angle α is set to range from 60° to 115° in the same way as in the case of the trapezoidal prisms 46.

Figure 16:
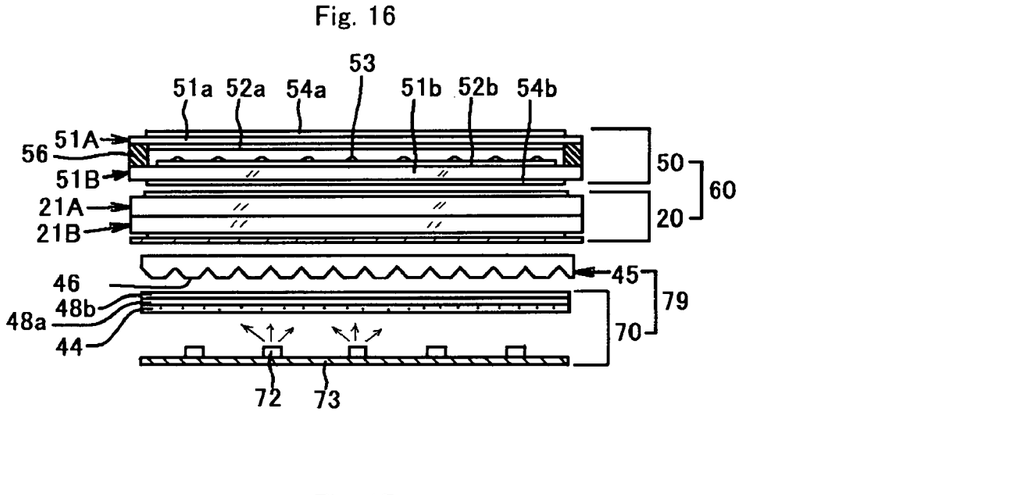
FIG. 16 is a sectional view of an essential part of a display apparatus having a backlight unit according to another embodiment of the present invention.

Next, a backlight unit according to another embodiment of the present invention and a display apparatus having the backlight unit will be described with reference to FIG. 16. This display apparatus is also a touch panel-equipped display apparatus for use in a car navigation system. The same component parts as those of the touch panel-equipped display apparatus according to the foregoing embodiment are denoted by the same reference symbols as those in the foregoing embodiment, and a detailed description thereof is omitted herein.

A planar light source member 70 in this embodiment comprises a light source 72 formed from LEDs, a reflector 73 provided at the lower side of the light source 72, a diffuser sheet 44 provided directly above the light source 72, and two prism sheets 48a and 48b provided over the diffuser sheet 44. It should be noted that the diffuser sheet 44 and the two prism sheets 48a and 48b are those having the same specifications as those of the diffuser sheet 44 and the prism sheets 48a and 48b used in the foregoing embodiment. The two prism sheets 48a and 48b are disposed such that the ridges of their prisms intersect perpendicularly to light exiting the planar light source member and having directivity in the perpendicular direction, and that the prism surfaces of both the prism sheets 48a and 48b face upward, i.e. toward the optical member 45.

The light source 72 is formed from a plurality of LEDs that are spaced such that the unevenness in illumination brightness is minimized. The LEDs emit light directly toward the diffuser sheet 44 provided above them.

As the reflector 73, an aluminum sheet of 0.1 to 0.15 mm in thickness finished with a mirror surface is used in this embodiment. It should be noted that the reflector 73 can be replaced with a reflective sheet or a white plastic support frame, for example. An appropriate one should preferably be selected from among these reflecting members according to the structures of the backlight unit and the display apparatus, etc.

The planar light source member 70 arranged as stated above provides very high illumination brightness. Because of the structure wherein light from LEDs is utilized directly for illumination, the utilization efficiency of light is very high, and effective illumination can be performed. Although LEDs are used to constitute the light source 72 in this embodiment, the same advantageous effects can also be obtained by using a necessary number of cold-cathode fluorescence lamps.

It should be noted that the operation of the optical member 45 provided with the trapezoidal prisms 46 is the same as that explained in the foregoing embodiment. That is, directivity of light in three directions can be obtained. Therefore, the backlight unit structure of this embodiment is also favorably applicable to car navigation systems. In such an application, a very bright and sharp display image can be obtained thanks to the above-described advantageous effects of the backlight unit structure.

Next, a backlight unit according to a further embodiment of the present invention will be described with reference to FIG. 17.

Figure 17:
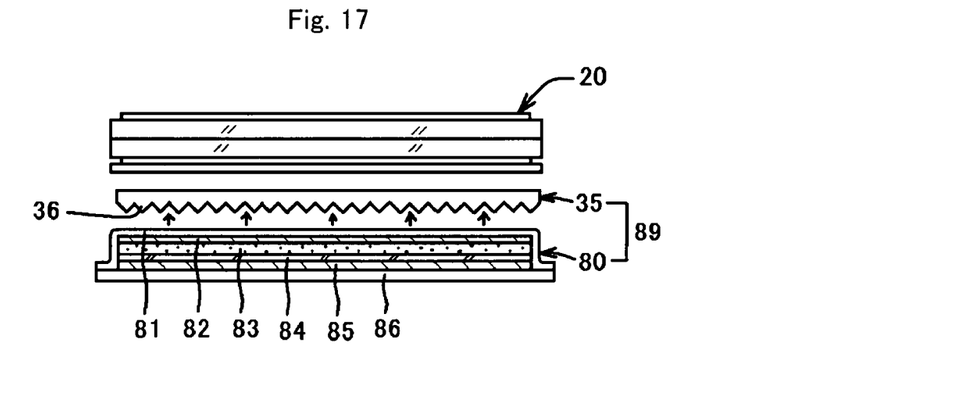
FIG. 17 is a sectional view of an essential part of a display apparatus having a backlight unit according to a further embodiment of the present invention.

As shown in FIG. 17, a backlight unit 89 according to this embodiment comprises an optical member 35 and a planar light source member 80 and is provided directly below a display device 20. The display device 20 and the optical member 35 in this embodiment are those having the same specifications as those of the display device and the optical member in the foregoing embodiment. Therefore, the display device 20 and the optical member 35 are denoted by the same reference symbols as those used in the foregoing embodiment, and a detailed description thereof is omitted herein.

The optical member 35 in this embodiment is placed so that the surface thereof where the prisms 36 are provided faces the planar light source member 80. The planar light source member 80 is formed from a distributed electroluminescence device (hereinafter referred to simply as "EL").

The EL constituting the planar light source member 80 has a transparent substrate 81. A transparent electrode 82, a luminous layer 83, a dielectric layer 84 and a back electrode 85 are stacked on the lower side of the transparent substrate 81 and covered with a moisture-resistant insulating film 86. If a required voltage is applied between the transparent electrode 82 and the back electrode 85, the luminous layer 83 emits light. The emitted light exits toward the triangular prisms 36 of the optical member 35 as shown by the arrows in the figure.

The transparent substrate 81 is formed by using a transparent glass or PET (polyethylene terephthalate) film, for example. The transparent electrode 82 is made of ITO (Indium Tin Oxide) film formed, for example, by vapor deposition of ITO powder prepared by doping indium oxide ($In_2O_3$) with tin oxide ($SnO_2$). The luminous layer 83 is formed as follows. A luminous powder is prepared by doping zinc sulfide (ZnS) used as a luminous parent material with a trace amount of an additive (a metal or a halogen). The luminous powder thus obtained is dispersed in a high-dielectric resin binder, e.g. a cyanoethyl compound, to prepare a dispersion, which is then printed by screen printing or other printing method to form the luminous layer 83. The dielectric layer 84 is formed by screen printing or other printing method using a dispersion prepared by dispersing a high-dielectric substance, e.g. barium titanate, into a high-dielectric resin binder. The back electrode 85 is formed by screen printing or other printing method using an electrically conductive paste, e.g. silver paste or graphite paste. The insulating film 86 is formed by using a resin excellent in insulating and moisture-resisting properties or a PET film, for example.

Because the EL is about 0.2 mm in thickness, the planar light source member 80 can be reduced in thickness, advantageously. In addition, because a uniform emission luminance distribution can be obtained, no brightness unevenness appears.

The backlight unit having the above-described structure provides uniform illumination brightness and allows a thickness reduction. In addition, directivity of light in two directions can be obtained by the action of the prisms 36 of the optical member 35, as stated in the foregoing embodiment.

It should be noted that the present invention is not necessarily limited to the foregoing embodiments but can be modified in a variety of ways without departing from the gist of the present invention.

What is claimed is:

1. A backlight unit comprising:
   a planar light source member having a light-emitting surface, the planar light source member being configured to emit from the light-emitting surface light having a single directivity perpendicular to the light-emitting surface; and
   an optical member having a light-receiving surface facing the light-emitting surface of the planar light source member and a light-emitting surface opposite to the light-receiving surface,
   the light-receiving surface and light-emitting surface of the optical member being parallel to the light-emitting surface of the planar light source member,
   the light-receiving surface of the optical member having a multiplicity of prisms extending parallel to each other and perpendicular to the directivity direction of the light from the planar light source, so that the light from the planar light source having the single directivity and incident perpendicularly upon the light-receiving surface of the optical member is transformed by the prisms into light having at least two different directivities and emitted from the light-emitting surface of the optical member in directivity directions each angled around a perpendicular to the light-emitting surface of the optical member.

2. A backlight unit according to claim 1, wherein the light-receiving surface and light-emitting surface of the optical member are parallel to the light-emitting surface of the planar light source member, the light-receiving surface of the optical member having a multiplicity of prisms extending parallel to each other and perpendicular to the directivity direction of the light from the planar light source, so that the light from the planar light source having the single directivity is incident perpendicularly on the light-receiving surface of the optical member and diverged by the prisms into the light having the at least two different directivities.

3. A backlight unit according to claim 1, wherein the prisms each have a triangular cross section and project toward the light-emitting surface of the planar light source member.

4. A backlight unit according to claim 3, wherein the prisms are spaced apart from each other with a flat surface being present between two adjacent prisms, the flat surfaces extending parallel to the prisms.

5. A backlight unit according to claim 3, wherein the triangular cross section that faces the light-emitting surface of the planar light source member makes an apex angle ranging from 60° to 115°.

6. A backlight unit according to claim 5, wherein the triangular cross section of each prism is isosceles.

7. A backlight unit according to claim 1, wherein the prisms each have a trapezoidal cross section and project toward the light-emitting surface of the planar light source member, the prisms each having a flat surface at its top thereof and surfaces inclined from the flat surface.

8. A backlight unit according to claim 7, wherein the inclined surfaces of each of the prisms makes an angle ranging from 60° to 115°.

9. A backlight unit according to claim 8, wherein the inclined surfaces of each prism is included at an equal angle from the flat surface.

10. A display apparatus comprising:
    the backlight unit of claim 1; and
    a display panel having a light-receiving surface facing the light-emitting surface of the optical member of the backlight unit and a light-emitting surface opposite to the light-receiving surface thereof.

11. A display apparatus according to claim 10, wherein the prisms each have a triangular cross section and project toward the light-emitting surface of the planar light source member.

12. A display apparatus according to claim 11, wherein the prisms are spaced apart from each other with a flat surface being present between two adjacent the prisms, the flat surface extending parallel to the prisms.

13. A display apparatus according to claim 12, wherein the triangular cross section of each prism is isosceles.

14. A display apparatus according to claim 11, wherein an apex angle of the triangular sectional configuration that faces the light-emitting surface of the planar light source member ranges from 60° to 115°.

15. A display apparatus according to claim 10, wherein the prisms each have a trapezoidal cross section and project toward the light-emitting surface of the planar light source member, each of the prisms having a flat surface at its top thereof and surfaces inclined from the flat surface.

16. A display apparatus according to claim 15, wherein the inclined surfaces of each of the prisms forms an angle ranging from 60° to 115°.

17. A display apparatus according to claim 16, wherein the inclined surfaces are included at an equal angle from the flat surface.

* * * * *

UNITED STATES PATENT AND TRADEMARK OFFICE
CERTIFICATE OF CORRECTION

PATENT NO. : 7,530,720 B2  Page 1 of 1
APPLICATION NO. : 11/710311
DATED : May 12, 2009
INVENTOR(S) : Takashi Shimura It is certified that error appears in the above-identified patent and that said Letters Patent is hereby corrected as shown below:

In column 14, claim 12, line 46, after "between two adjacent" delete "the".

Signed and Sealed this

Twenty-ninth Day of September, 2009

David J. Kappos
*Director of the United States Patent and Trademark Office*